US008413137B2

(12) United States Patent
Brunet et al.

(10) Patent No.: US 8,413,137 B2
(45) Date of Patent: Apr. 2, 2013

(54) AUTOMATED NETWORK BACKUP PERIPHERAL DEVICE AND METHOD

(75) Inventors: Jeffrey Brunet, Richmond Hill (CA); Yousuf Chowdhary, Maple (CA); Alex Lemelev, Thornhill (CA); Alex Zhukobski, Toronto (CA)

(73) Assignee: Storage Appliance Corporation, Richmond Hill (CA)

( * ) Notice: Subject to any disclaimer, the term of this patent is extended or adjusted under 35 U.S.C. 154(b) by 330 days.

(21) Appl. No.: 13/021,080

(22) Filed: Feb. 4, 2011

(65) Prior Publication Data

US 2011/0191769 A1 Aug. 4, 2011

Related U.S. Application Data

(60) Provisional application No. 61/337,435, filed on Feb. 4, 2010.

(51) Int. Cl.
*G06F 9/445* (2006.01)
(52) U.S. Cl. .................. 717/174; 717/175; 707/822
(58) Field of Classification Search .................. 717/174
See application file for complete search history.

(56) References Cited

U.S. PATENT DOCUMENTS

| 5,212,784 A | 5/1993 | Sparks |
| 5,666,215 A | 9/1997 | Fredlund et al. |
| 5,835,759 A | 11/1998 | Moore et al. |
| 5,959,280 A | 9/1999 | Kamitami |
| 5,960,411 A | 9/1999 | Hartman et al. |
| 6,119,153 A | 9/2000 | Dujari et al. |
| 6,131,148 A | 10/2000 | West |
| 6,282,710 B1 | 8/2001 | Boehler |
| 6,401,214 B1 | 6/2002 | Li |
| 6,405,362 B1 | 6/2002 | Shih et al. |

(Continued)

FOREIGN PATENT DOCUMENTS

| EP | 1168322 A1 | 1/2002 |
| EP | 1233409 A2 | 8/2002 |

(Continued)

OTHER PUBLICATIONS http://web.archive.org/web/20050125085304/http://www.bjorn3d.com/read.php?cID=748, p. 2, Jan. 25, 2005.

(Continued)

*Primary Examiner* — Don Wong
*Assistant Examiner* — Deric Ortiz
(74) *Attorney, Agent, or Firm* — Gard & Kaslow LLP

(57) ABSTRACT

Automatically backing up one or more computers across a network to a backup device coupled to the network through one of the computers connected to the network. In one embodiment, a user connects the backup device to a first network connected computer which triggers the launch, installation, setup and configuration of the associated software on the first computer thereby performing a backup operation of data from the first computer to the backup device. The user then connects the backup device to a second network connected computer which triggers the launch, installation, setup and configuration of the associated software on the second computer thereby performing a backup operation of data from the second computer to the backup device. Furthermore, the associated software installed on the second computer triggers communication with and a backup of data from the first computer across the network through the second computer to the backup device.

20 Claims, 6 Drawing Sheets

U.S. PATENT DOCUMENTS

| | | |
|---|---|---|
| 6,411,943 B1 | 6/2002 | Crawford |
| 6,469,967 B1 | 10/2002 | Mau |
| 6,473,794 B1 | 10/2002 | Guheen |
| 6,477,575 B1 | 11/2002 | Koeppel et al. |
| 6,487,558 B1 | 11/2002 | Hitchcock |
| 6,488,581 B1 | 12/2002 | Stockdale |
| 6,496,979 B1 | 12/2002 | Chen et al. |
| 6,505,236 B1 | 1/2003 | Pollack |
| 6,529,992 B1 | 3/2003 | Thomas |
| 6,567,273 B1 | 5/2003 | Liu |
| 6,588,662 B1 | 7/2003 | Hu |
| 6,603,676 B2 | 8/2003 | Kitagawa |
| 6,606,644 B1 | 8/2003 | Ford et al. |
| 6,609,173 B1 | 8/2003 | Watkins |
| 6,611,850 B1 | 8/2003 | Shen |
| 6,654,797 B1 | 11/2003 | Kamper |
| 6,684,229 B1 | 1/2004 | Luong et al. |
| 6,701,456 B1 | 3/2004 | Biessener |
| 6,731,536 B1 | 5/2004 | McClain et al. |
| 6,751,681 B2 | 6/2004 | Torii et al. |
| 6,813,682 B2 | 11/2004 | Bress et al. |
| 6,813,725 B1 | 11/2004 | Hanes |
| 6,832,107 B2 | 12/2004 | Mashiko |
| 6,839,721 B2 | 1/2005 | Schwols |
| 6,845,464 B2 | 1/2005 | Gold |
| 6,856,425 B2 | 2/2005 | Ozawa et al. |
| 6,868,227 B2 | 3/2005 | Luman |
| 6,876,461 B2 | 4/2005 | Usami |
| 6,879,988 B2 | 4/2005 | Basin et al. |
| 6,889,376 B1 | 5/2005 | Barritz |
| 6,898,517 B1 | 5/2005 | Froeberg |
| 6,901,493 B1 | 5/2005 | Maffezzoni |
| 6,943,681 B2 | 9/2005 | Rezvani et al. |
| 6,976,253 B1 | 12/2005 | Wierman et al. |
| 6,985,248 B2 | 1/2006 | Parulski et al. |
| 6,986,030 B2 | 1/2006 | Shmueli et al. |
| 6,993,760 B2 | 1/2006 | Peev et al. |
| 7,017,155 B2 | 3/2006 | Peev et al. |
| 7,024,529 B2 | 4/2006 | Yamada |
| 7,054,260 B2 | 5/2006 | Rilum et al. |
| 7,054,594 B2 | 5/2006 | Bloch et al. |
| 7,095,519 B1 | 8/2006 | Stewart |
| 7,111,121 B2 | 9/2006 | Oishi et al. |
| 7,136,288 B2 | 11/2006 | Hoogerdijk |
| 7,137,034 B2 | 11/2006 | Largman |
| 7,162,500 B2 | 1/2007 | Iguchi |
| 7,165,082 B1 | 1/2007 | DeVos |
| 7,200,546 B1 | 4/2007 | Nourmohamadian |
| 7,207,033 B2 | 4/2007 | Kung |
| 7,213,766 B2 | 5/2007 | Ryan et al. |
| 7,266,668 B2 | 9/2007 | Hartung |
| 7,302,538 B2 | 11/2007 | Liu |
| 7,305,577 B2 | 12/2007 | Zhang |
| 7,308,528 B2 | 12/2007 | Kitamura |
| 7,330,997 B1 | 2/2008 | Odom |
| 7,334,226 B2 | 2/2008 | Ramachandran et al. |
| 7,363,510 B2 | 4/2008 | Bobrow |
| 7,401,194 B2 | 7/2008 | Jewell |
| 7,461,144 B1 | 12/2008 | Beloussov |
| 7,519,767 B2 | 4/2009 | Slater |
| 7,558,928 B1 | 7/2009 | DeVos |
| 7,606,946 B2 | 10/2009 | Kobayashi et al. |
| 7,739,429 B2 | 6/2010 | Shih |
| 7,761,456 B1 | 7/2010 | Cram et al. |
| 7,818,160 B2 | 10/2010 | Collins et al. |
| 2001/0047389 A1 | 11/2001 | Prahlad et al. |
| 2001/0056425 A1 | 12/2001 | Richard |
| 2002/0023198 A1 | 2/2002 | Kokubun et al. |
| 2002/0026575 A1 | 2/2002 | Wheeler et al. |
| 2002/0036850 A1 | 3/2002 | Lenny et al. |
| 2002/0064111 A1 | 5/2002 | Horie |
| 2002/0112171 A1 | 8/2002 | Ginter et al. |
| 2002/0162009 A1 | 10/2002 | Shmueli et al. |
| 2002/0184115 A1 | 12/2002 | Mueller et al. |
| 2002/0184459 A1 | 12/2002 | Taussig et al. |
| 2002/0184559 A1 | 12/2002 | Qin et al. |
| 2002/0188566 A1 | 12/2002 | Inchalik et al. |
| 2002/0191788 A1 | 12/2002 | Inchalik et al. |
| 2002/0196729 A1 | 12/2002 | Fairman et al. |
| 2002/0196940 A1 | 12/2002 | Isaacson et al. |
| 2003/0011809 A1 | 1/2003 | Suzuki et al. |
| 2003/0048735 A1 | 3/2003 | Sawada et al. |
| 2003/0050940 A1 | 3/2003 | Robinson |
| 2003/0058763 A1 | 3/2003 | Noda |
| 2003/0069750 A1 | 4/2003 | Siegel et al. |
| 2003/0074529 A1 | 4/2003 | Crohas |
| 2003/0105643 A1 | 6/2003 | Chen et al. |
| 2003/0120740 A1 | 6/2003 | Beeman et al. |
| 2003/0149662 A1 | 8/2003 | Shore |
| 2003/0156341 A1 | 8/2003 | Ito |
| 2003/0163610 A1 | 8/2003 | Stevens |
| 2003/0182471 A1 | 9/2003 | Harris et al. |
| 2003/0190137 A1 | 10/2003 | Pesce |
| 2003/0195737 A1 | 10/2003 | Shapiro et al. |
| 2003/0225971 A1 | 12/2003 | Oishi et al. |
| 2003/0233525 A1 | 12/2003 | Reeves |
| 2004/0008209 A1 | 1/2004 | Adams et al. |
| 2004/0044863 A1 | 3/2004 | Trimmer et al. |
| 2004/0078514 A1 | 4/2004 | Kung et al. |
| 2004/0083473 A1 | 4/2004 | Thomas et al. |
| 2004/0088456 A1 | 5/2004 | Zhang |
| 2004/0145988 A1 | 7/2004 | Watanabe |
| 2004/0153614 A1 | 8/2004 | Bitner et al. |
| 2004/0167941 A1 | 8/2004 | Prahlad et al. |
| 2004/0172427 A1 | 9/2004 | Thomas et al. |
| 2004/0172489 A1 | 9/2004 | Shikada |
| 2004/0184174 A1 | 9/2004 | Woo |
| 2004/0193744 A1 | 9/2004 | Paley |
| 2004/0199600 A1 | 10/2004 | Dorundo et al. |
| 2004/0230653 A1 | 11/2004 | Liao |
| 2004/0230863 A1 | 11/2004 | Buchhorn |
| 2004/0243745 A1 | 12/2004 | Bolt |
| 2005/0010835 A1 | 1/2005 | Childs et al. |
| 2005/0015536 A1 | 1/2005 | Lee |
| 2005/0015559 A1 | 1/2005 | Shen et al. |
| 2005/0021880 A1 | 1/2005 | Robbin et al. |
| 2005/0027956 A1 | 2/2005 | Tomasov et al. |
| 2005/0033911 A1 | 2/2005 | Kitamura et al. |
| 2005/0052548 A1 | 3/2005 | Delaney |
| 2005/0060356 A1 | 3/2005 | Saika |
| 2005/0071524 A1 | 3/2005 | Liu et al. |
| 2005/0080973 A1 | 4/2005 | Lee |
| 2005/0081006 A1 | 4/2005 | Shackelford et al. |
| 2005/0083741 A1 | 4/2005 | Chang et al. |
| 2005/0086326 A1 | 4/2005 | Manning et al. |
| 2005/0114450 A1 | 5/2005 | DeVos |
| 2005/0157315 A1 | 7/2005 | Kato |
| 2005/0157603 A1 | 7/2005 | Tseng |
| 2005/0174676 A1 | 8/2005 | Lin |
| 2005/0182872 A1 | 8/2005 | Shih |
| 2005/0193389 A1 | 9/2005 | Murphy et al. |
| 2005/0213146 A1 | 9/2005 | Parulski |
| 2005/0216746 A1 | 9/2005 | Saika |
| 2005/0216794 A1 | 9/2005 | Yagawa |
| 2005/0226059 A1 | 10/2005 | Kavuri et al. |
| 2005/0228836 A1* | 10/2005 | Bacastow et al. ............ 707/204 |
| 2005/0245249 A1 | 11/2005 | Wierman et al. |
| 2005/0246583 A1 | 11/2005 | Robinson |
| 2005/0253554 A1 | 11/2005 | DiFazio et al. |
| 2005/0268339 A1 | 12/2005 | Bobrow |
| 2005/0278432 A1 | 12/2005 | Feinleib et al. |
| 2006/0010078 A1 | 1/2006 | Rezvani et al. |
| 2006/0031289 A1 | 2/2006 | Experton |
| 2006/0036553 A1 | 2/2006 | Gupta et al. |
| 2006/0041639 A1 | 2/2006 | Lamkin et al. |
| 2006/0059308 A1 | 3/2006 | Uratani et al. |
| 2006/0069921 A1 | 3/2006 | Camaisa et al. |
| 2006/0075293 A1 | 4/2006 | Bodlaender |
| 2006/0080521 A1 | 4/2006 | Barr et al. |
| 2006/0101191 A1 | 5/2006 | Pinson |
| 2006/0123189 A1 | 6/2006 | Bitner et al. |
| 2006/0143376 A1 | 6/2006 | Matze et al. |
| 2006/0161635 A1 | 7/2006 | Lamkin et al. |
| 2006/0161802 A1 | 7/2006 | Wang et al. |
| 2006/0164891 A1 | 7/2006 | Mills |
| 2006/0179448 A1 | 8/2006 | Smith et al. |
| 2006/0190722 A1 | 8/2006 | Sharma et al. |

| | | | |
|---|---|---|---|
| 2006/0198202 | A1 | 9/2006 | Erez |
| 2006/0200623 | A1 | 9/2006 | Gonzalez et al. |
| 2006/0218435 | A1 | 9/2006 | van Ingen et al. |
| 2006/0224846 | A1 | 10/2006 | Amarendran et al. |
| 2007/0006017 | A1 | 1/2007 | Thompson et al. |
| 2007/0043888 | A1 | 2/2007 | Suzuki et al. |
| 2007/0043898 | A1 | 2/2007 | Suzuki et al. |
| 2007/0043973 | A1 | 2/2007 | Schneider |
| 2007/0083354 | A1 | 4/2007 | Collins et al. |
| 2007/0179955 | A1 | 8/2007 | Croft et al. |
| 2007/0214332 | A1 | 9/2007 | Sonoda et al. |
| 2007/0250655 | A1 | 10/2007 | Ferchau et al. |
| 2008/0133827 | A1 | 6/2008 | Topham et al. |
| 2008/0215873 | A1 | 9/2008 | Bobrow |

FOREIGN PATENT DOCUMENTS

| | | |
|---|---|---|
| EP | 1717697 A2 | 11/2006 |
| WO | 0019294 | 4/2000 |
| WO | 0127768 | 4/2001 |
| WO | 0184265 | 11/2001 |
| WO | 0218009 | 3/2002 |
| WO | 0239231 | 5/2002 |
| WO | 030314933 A1 | 2/2003 |
| WO | 03048944 | 6/2003 |
| WO | 2004067286 | 8/2004 |
| WO | 2005086002 A1 | 9/2005 |
| WO | 2007041849 | 4/2007 |
| WO | 2007041850 A1 | 4/2007 |

OTHER PUBLICATIONS

Brown, Christopher L. T., "Analysis of the ATA Protected Area," technical white paper, TechPathways LLC, www.techpathways.com, 2002.
Brown University, "Image File Format," www.archive.org, http://web.archive.org/web/20060622060840/http://cs.brown.edu/stc/summer/workshop/summer_formats.html, pp. 1-2.
Clark, Scott, "U3—Official portable USB apps platform," Everything USB website via archive.org, www.everythingusb.com/u3.html, pp. 1-5, Oct. 13, 2005.
CNET.com, "Lapback 1.9.8," Sep. 3, 2005.
Consumer Report, "Backup drives essential but underused," pp. 30-31, Sep. 2006.
Duryee, Tricia, "Store your digital content on a hard drive in the sky," Tech Monday, San Jose Mercury News, pp. 5E, Jul. 4, 2006.
Evans, Mark, "Hard drive self-tests," Quantum Corporation, T10/99-179 rev 0, Apr. 26, 1999.
Group Fetch, "Mailbox fetch," http://www.groupfetch.com, 2006.
IBM, "Automatic tape backup of customer's critical direct access storage device areas," IBM Technical Disclosure Bulletin, 39(12):37-38, Dec. 1, 1996.
InboxRULES, "Save message," Ornic USA, LLC, 1996-2007.
Mira.com, "Frequently asked questions about Mira," mira.com and archive.org, http://web.archive.org/ web/20050206184942/www.mira.com/product/file_backup_guide.html, pp. 1-5, Feb. 2005.
Mira.com. "Why Mira is different . . . and better," mira.com and archive.org, http://web.archive.org/web/20050206192005/www.mira.com/product/why_mira_is_different.html, p. 5, Feb. 2005.
Musselwhite, Dr. Caroline et al., "AAC Intervention," http://www.aacintervention.com/tipfive.html, pp. 1-3, 2005.
Musselwhite, Dr. Caroline et al., "About graphics/digital images," AACIntervention, pp. 1-6.
Microsoft, "Outlook, Outlook Express, and Windows mail attachment tools . . . ," Outlook attachment and picture extractor, http://www.OPE2000.com, 2006.
Parvaneh, Marc K., "CD-ROMtm Overview & Implementations," ODC White Paper, Optical Disc Corporation.
PCMag, "U3 Preview," Sep. 21, 2005.
Wong, Nicole, "One key stroke saves your data," First Look, Tech Insider, San Jose Mercury News, pp. 2E, Apr. 2, 2007.
Rothman, Wilson, "Now it's easy to back up data on a network," The New York Times, http://nytimes.com, Mar. 30, 2006.
Seagate, "Enhanced drive self-test—winning the war against unnecessary drive returns," Executive Summary, Personal Storage Product Marketing, No. TP-302.1, Jun. 2000.
NSoftware, "Attachment extractor for Outlook Express v. 1.5," 2003-2008 NSoftware.
Software Central, "Lapback U3," 2005.
Takahashi, Dean, "Backup drive fits in a pocket," First Look, Tech Insider, San Jose Mercury News, pp. 2E, Jun. 4, 2007.
TurnKey Technology Solutions, http://www.turnkeytechnology.biz/, Apr. 10, 2007.
U3, "U3 Smart Drive Computing Platform," Jun. 2005.
Wikipedia, "Audio file format," http://www.wikipedia.org, p. 1-4, Jul. 29, 2006.
Wikipedia, "Image file formats," http://www.wikipedia.org, p. 1-5, Jul. 13, 2006.
Wikipedia, "MPEG4 part 14," http://www.wikipedia.org. p. 1-3, Jun. 5, 2006.

* cited by examiner

AUTOMATED NETWORK BACKUP PERIPHERAL DEVICE AND METHOD

CROSS-REFERENCE TO RELATED APPLICATIONS

This application claims the benefit of U.S. Provisional Patent Application No. 61/337,435 filed on Feb. 4, 2010 and entitled "Method and a System for a Virtual Network Attached Storage Device," which is incorporated herein by reference in its entirety.

BACKGROUND OF THE INVENTION

1. Field of the Invention

The present invention relates generally to performing data backup operations across a computer network.

2. Description of the Prior Art

The creation and value of personal digital content is dramatically increasing as people acquire new digital devices. In private households and in businesses, there are increasingly large collections of digital data. Digital photos stored on a PC have replaced shoeboxes full of family photos. Moving Picture Experts Group Audio Layer 3 (MP3) music collections have displaced shelves of Compact Discs (CDs) or vinyl records. Digital video and Personal Video Recorder (PVR)-recorded television are poised to replace videotape collections. The devices generating the digital files have become more sophisticated and therefore the resultant data file sizes have become significantly larger. The amount of digital data that people have has risen dramatically in recent years and, with this rise, there has been an attendant increase in the need for simple data backup.

The revolution in digital data has swept through faster than backup options have been able to mature. Personal Computer (PC) storage has notorious vulnerabilities. Almost everyone who owns a PC has experienced the loss of data.

Existing backup solutions, developed mostly for the corporate market, are expensive, bulky and overly complicated. For an everyday consumer the electronic data backup process is not easy and not everyone is technically savvy enough to use the current backup products. A need exists for an extremely simple, fully automated, and affordable backup appliance for digital data. Considering the impact of possibly losing irreplaceable family photos and documents due to computer failures, virus, theft or disasters, a user may want to have a copy of personal electronic data files in another device or location. Storing data with an online service provider is one option to have data redundancy or having a central device connected to the local area network is another option.

Thus one strategy for data backup is to use online data storage backup services offered by companies offering remote data storage facilities. In this way, instead of making copies of data locally, a user can opt to have the backed up data stored on a remote server using the interact for file transfer. Typically the user is required to sign up with a service provider and pay a monthly fee for storage of the backed up data or to obtain a copy of the backed up data for purposes of restoring lost or damaged data. It also requires having to install the provider's software and high speed internet connectivity to facilitate the rapid transfer of files. These services typically charge monthly or yearly fees based on the amount of data being backed up. While there are advantages to the online remote backup since the servers are located away from the home with lower risk of losing data to theft or disaster, such services can be a very expensive option for large amounts of data.

In a case where a user has multiple computers and wants to back them up there are some ways, though none that are very convenient. One example is having an external hard drive based backup device that connects to the computer via a Universal Serial Bus (USB) port and may have backup software on the backup drive itself. Thus a user can connect the backup device to the computer and it will be backed up to the device. But in the case of multiple computers the user is required to carry out this process with each of the computers one after the other. Thus if a user forgets to connect the backup device to a particular computer for an extended duration and the computer fails the data that was created during this period is lost.

Alternatively, a user may want to backup all data from different computers in an office or home to one central but local device so that data can be uniformly accessed from any computer. Typically a Network Attached Storage (NAS) fills this role by being plugged into the Ethernet port of the router of a local area network. A traditional NAS device is relatively expensive and requires complicated configuration. Further, it requires that the accompanying software be installed on each of the computers connected to the local area network (LAN) that need to be backed up.

A NAS unit is essentially a self-contained stripped down computer connected to a network, with the sole purpose of providing data storage services to other devices on the network. NAS units usually do not have a keyboard or display, and are controlled and configured over the network, often by connecting via an internet browser to their network (IP) address. A general-purpose operating system is not needed on a NAS device, and often minimal-functionality or stripped-down operating systems are used instead.

The NAS contains a network card with an Ethernet port which allows it to be connected to an Ethernet port of a router. A NAS maintains its own Internet Protocol (IP) address comparable to a computer and other Transmission Control Protocol/Internet Protocol (TCP/IP) devices. Using a software program that normally is provided together with the NAS hardware, a user can set up automatic or manual backups and file copies between the NAS and other network connected computers.

Additionally the software installed on each computer to be backed up needs to be manually configured in terms of specifying where the data to be backed up is located, what data is to be backed up and how often to backup the data.

What is needed therefore is a simplified data backup solution that can backup one or more the computers without requiring all the cost, complexity and user input of known solutions.

SUMMARY

In one example is a system for backing up network connected data sources, the system comprising: a backup device containing a data storage area and a communications interface for connection to a first data source of the network connected data sources; a computer readable medium containing program code executable by a processor to perform without user input the steps of: configuring the first data source for communication across the network with a second data source of the network connected data sources; performing a backup of the first data source by storing data to be backed up from the first data source to the backup device; performing a backup of the second data source by: establishing communication across the network between the first data source and the second data source; receiving at the first data source from the second data source across the established communication data to be backed up from the second data source; and storing to the backup device the received data to be backed up from the second data source.

In another example is a method of backing up network connected data sources, the method comprising: automatically and without user input launching and installing software from a backup device to a first data source of the network connected data sources upon detection of connection of the backup device to the first data source, the installed software configured to automatically and without user input perform the steps of: configuring the first data source for network backup communications; performing a backup of data from the first data source to the backup device connected to the first data source; establishing communication across the network between the first data source and a second data source of the network connected data sources, the software from the backup device having previously been automatically and without user input launched and installed on the second data source; performing a backup of data from the second data source to the backup device by: receiving at the first data source from the second data source across the established communication data to be backed up from the second data source; and storing to the backup device the received data to be backed up from the second data source.

In still another example is a method of backing up data to a backup device from a first and a second network connected data source, the method comprising: automatically launching and installing on the first data source backup software from the backup device in response to detection of the backup device being connected to the first data source; backing up data from the first data source to the backup device connected to the first data source using the backup software; automatically launching and installing on the second data source backup software from the backup device in response to detection of the backup device being connected to the second data source; backing up data from the second data source to the backup device connected to the second data source using the backup software; establishing communication across the network between the first data source and the second data source; backing up data from the first data source to the backup device connected to the second data source using the backup software.

DETAILED DESCRIPTION OF THE INVENTION

Figure 1:
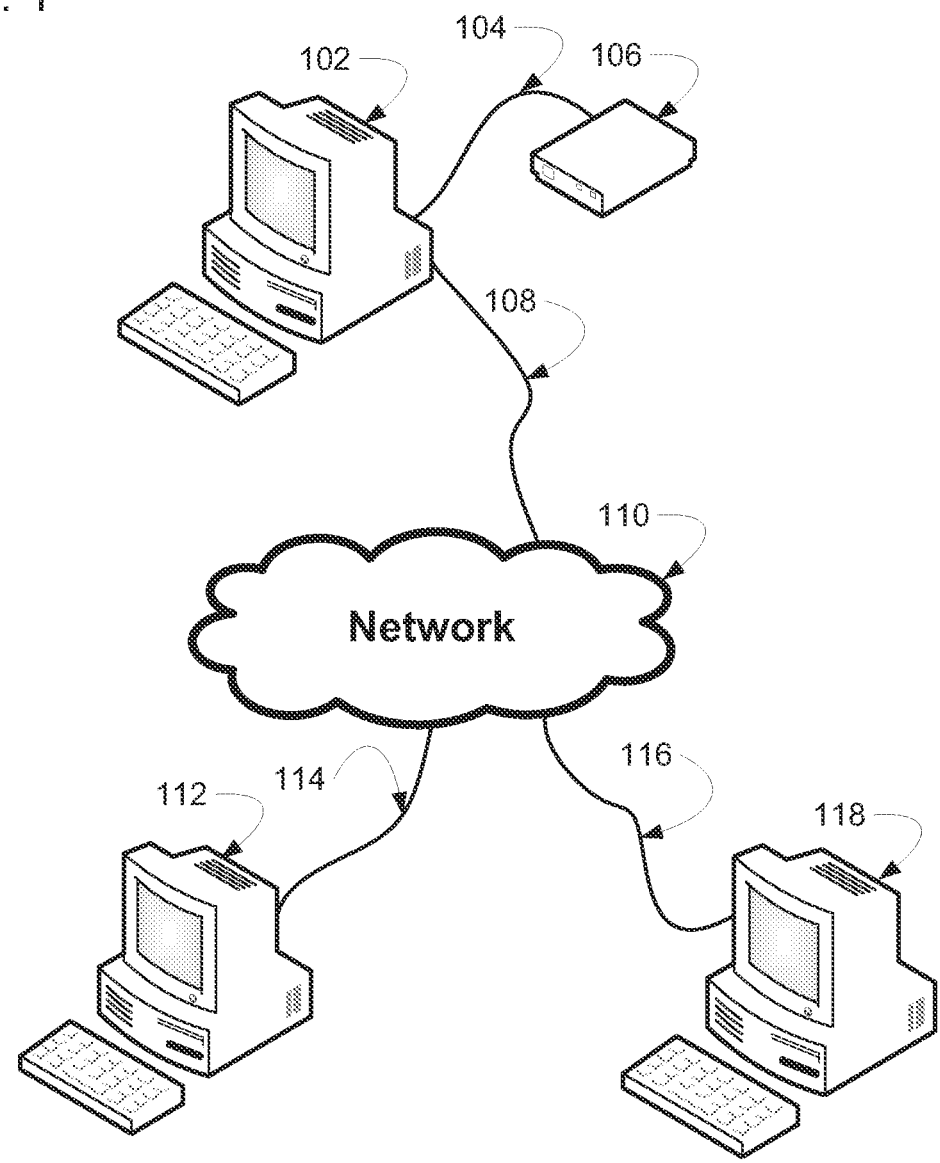
FIG. 1 shows a typical embodiment of device connections.

A system and method is provided for automatically backing up one or more computers across a network to a backup device coupled to the network through a computer connected to the network with little or no user input required.

In one embodiment, the backup device is a memory device and associated hardware containing software that will both perform a backup of data on a data source to which the memory device is connected and also communicate across a network with other data sources to perform a backup of data from those other data sources. The software can be launched automatically via an optional emulation component contained within the memory device as described in U.S. Pat. No. 7,818,160 which is incorporated by reference herein in its entirety. Alternatively, the software can be included on a portion of the memory device to be manually launched by a user of the device. In another alternative, the software can be included on a non-transitory computer readable medium such as an optical disc which may be, e.g., a Compact Disc Read Only Memory (CD-ROM) or a Digital Versatile Disc (DVD), that is physically separate from the memory device itself but that will launch when the CD-ROM is inserted into a player of a data source. In another alternative, the software can be downloaded from another computer such as a web server accessible across a network such as the internet. But regardless of implementation and whether the software will be automatically launched or will require some user involvement, the backup device of the present invention can still perform the functionalities of installation and configuration, as well as performing the backup operation itself, in an automated fashion thus eliminating the need for user input to accomplish such functionality.

It is to be understood that, in the present specification, launching software is the process of initiating the running of some executable program code, one previously existing example of which occurs when a user double-clicks on an ".exe" file to begin the program code execution (and it is to be further understood that launching herein does not refer to merely starting the running of some program code already installed on a data source). Launching is in contrast to, again in the context of the present specification, installation and configuration, which are the processes of placing executable code onto a data source for the purposes of execution which typically involves providing information about the program code to an operating system of the data source, etc., and making various settings and programmatic changes to enable the intended operation of the executable code within the data source.

In one embodiment the backup device preferably has a memory device, e.g., a hard drive that has more than one partition on it. One partition is formatted like a CD-ROM and emulates an autorun device. The other partition is used for data backup. Thus when the backup device is connected to a data source the data source enumerates two separate devices; a CD-ROM and a hard drive. The CD-ROM partition contains the software and an autorun.inf file. When the backup device is connected to the data source it reads the autrun.inf file and launches the software to which the autorun.inf file points.

Using the backup device with the emulation component as an exemplary embodiment, a user connects the backup device to a networked connected data source which triggers the launch, installation and configuration of software on the first data source thereby performing a backup operation of data from the first data source to the backup device. To elaborate, the software is launched on the first data source automatically due to the emulation component thus causing the software to be automatically installed on the first data source which results in the software being ready to perform a backup of the first data source and also causes the software (and portions of the first data source as described elsewhere herein) to be configured for communication across the network as needed. Again, this results in the software performing a backup operation of data from the first data source to the backup device.

The user then connects the backup device to a second network connected data source which triggers the launch, installation and configuration of software on the second data source thereby performing a backup operation of data from the second data source to the backup device. Furthermore, as explained further elsewhere herein, the software installed on the second data source triggers a (typically incremental but could be a full) backup of data from the first data source across the network through the second data source to the backup device.

This is repeated for each network connected data source the user connects to the backup device to thereby be backed up. Additional backups of these various network connected data sources can also be performed and further, the backup device may be reconnected to any one of the network connected data sources for further backups of the various network connected data sources.

FIG. 1 shows a typical embodiment of device connections. Data source 102 is connected to a network 110, such as a local area network (LAN), via a wired or wireless connection 108. Data source 112 is also connected to network 110 via wired or wireless connection 114 as is data source 118 which is connected to network 110 via wired or wireless connection 116. An exemplary backup device 106 is connected to data source 102 preferably via a Universal Serial Bus (USB) cable 104. Because data source 102 is the data source directly connected to backup device 106, data source 102 is considered a "local" data source versus data source 112 and data source 118 which are only coupled to backup device 106 via network 110 and local data source 102 and are therefore considered "remote" data sources, at least within the context of the present specification. Data is backed up over network 110 from data source 112 and 118 via data source 102 and ultimately stored in the backup device 106. In this way the user can connect the backup device to any computer on the network and backup all computers connected to the network as explained further elsewhere herein.

Figure 2:
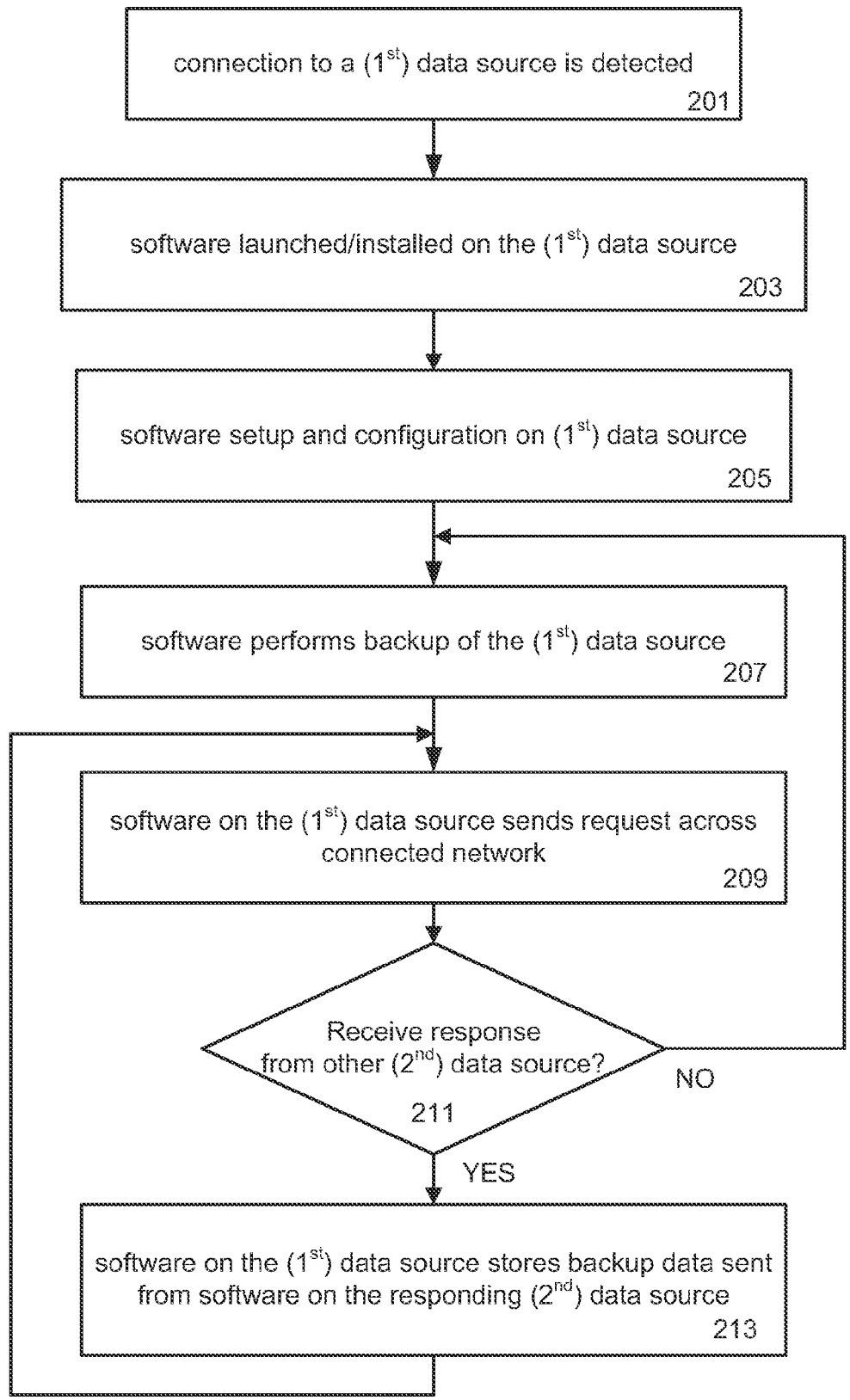
FIG. 2 is a flow chart representation of the operation of the backup device and associated software according to at least one embodiment.

FIG. 2 further explains the operation of the backup device and associated software. When a user connects the backup device to a first ("local") data source (e.g., data source 102 of FIG. 1) the first data source detects this connection in step 201. The software on the backup device is launched and installed on the first data source in step 203. The software configures the first data source as needed to handle the data backup and network communications in step 205. The software performs a backup of data from the first data source to the backup device connected to the first data source in step 207. The software running on the first data source sends a communication across the network (e.g., network 110 of FIG. 1) in step 209 to any other ("remote") data sources also connected to the network that already have the same software installed and running on them from having previously been connected to the backup device (e.g., data source 112 of FIG. 1). A determination is made in step 211 as to whether a response from any other such remote data sources is received by software running on the first ("local") data source. If no responses are received then the process returns to step 207 for performing further (incremental) backups of the first data source. Alternatively, if a response is received then in step 213 the software running on the first ("local") data source communicates with the software running on such other remote second data source to handle a data backup of data from the other remote second data source to the first data source. In this example, determining which data files to back up is handled by the software running on the remote data source while actually storing the files being backed up from the remote data source is handled by the software running on the local data source. Once this backup is complete the process then returns to step 209 to determine if there are any other remote data sources to be backed up.

Figure 3:
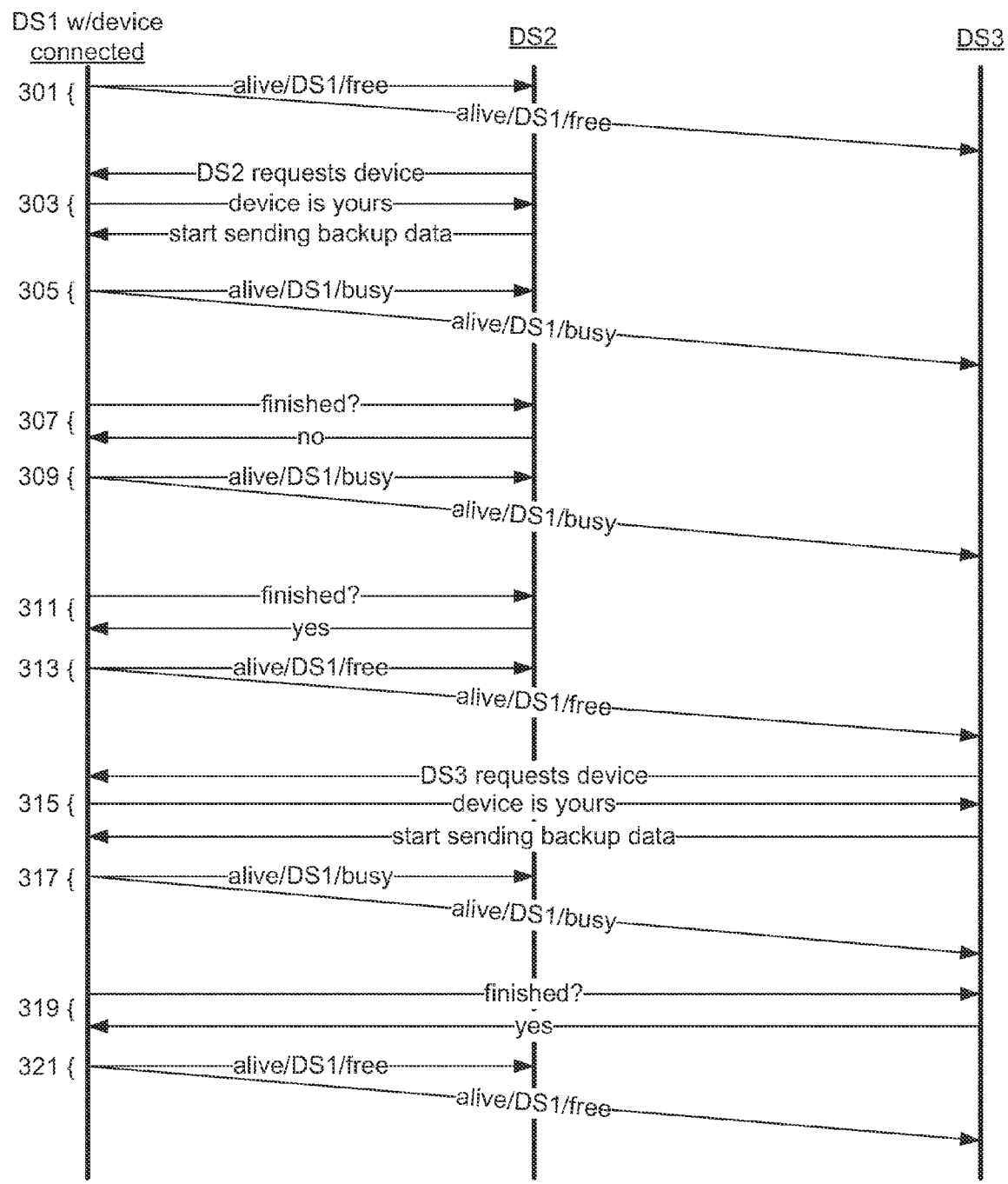
FIG. 3 is a diagram showing the flow of commands and messages exchanged between various devices across the network according to at least one embodiment.

FIG. 3 shows the process flow of the commands and messages that are exchanged by the different data sources when connected over the network and the backup device is connected to one of the data sources. In the case of the network being a LAN, in one embodiment the messages that are broadcast over the LAN use User Datagram Protocol (UDP) and the messages that are exchanged for pointed communication between two data sources use Transmission Control Protocol (TCP) both protocols known in the art.

In the figure are shown communications between three data sources DS1, DS2 and DS3 connected to a local area network. The backup device is physically connected to DS1 thus making DS1 a local data source. Using UDP the software running on DS1 periodically sends a broadcast message consisting of three parts "I am alive+backup device location+status." Thus, in this example, the datagram message 301 of "alive/DS1/free" is communicating that the backup device is "alive," that it is connected to "DS1," and that the backup device (and associated software) is "free" meaning that it is available for use by other data sources. This datagram message 301 is broadcast across the network from DS1 and is therefore received by both DS2 and DS3 as shown in the figure. In response to this datagram message, in this example 303, DS2 responds to DS1 using TCP with a request to use the backup device. DS1 then responds back to DS2 using TCP with a communication that the backup "device is yours." DS2 then responds back to DS1 to perform a backup process by sending data to DS1 to be stored on the backup device connected to DS1.

Periodically, e.g., at 305 and 309 in the figure, DS1 sends a UDP datagram message of "alive/DS1/busy" across the network thus communicating that the backup device is "alive," is connected to data source "DS1," but that it is "busy" performing a backup operation for some data source. Because this datagram message 309 is broadcast across the network from DS1 it is therefore received by both DS2 and DS3 as shown in the figure.

Periodically, e.g., at 307 in the figure, DS1 sends a TCP message to DS2 asking whether it is "finished" doing a backup to the backup device connected to DS1. In this example, DS2 replies with a TCP message that "no" it is not yet finished.

This sequence of UDP datagram messages and TCP message are repeated until, as shown in the figure at 311, at some point DS1 sends to DS2 the TCP message asking whether it is "finished" doing the backup and DS2 replies with a TCP message that "yes" it is finished. It is at this point 313 that DS1 once again sends out a UDP datagram message of "alive/DS1/free" across the network to be received by any other network connected data sources running the software.

In the example shown in the figure at 315, DS1 then receives a TCP message from DS3 with a request to use the backup device connected to DS1. DS1 then responds back to DS3 using TCP with a communication that the backup "device is yours." DS3 then responds back to DS1 to perform a backup process by sending data to DS1 to be stored on the backup device connected to DS1.

As with the sequence described regarding DS2, once the backup of DS3 is complete as shown in the figure at 319, DS1 sends a UDP broadcast datagram "alive/DS1/free" as shown at 321.

This sequence can continue until all network connected data sources having the software previously installed have been backed up or the backup device is disconnected from DS1 or DS1 is shut down. Note that the backup device can also be connected to any other data source connected to the network and the described process can be repeated with the newly connected data source acting as the local data source.

Figure 4:
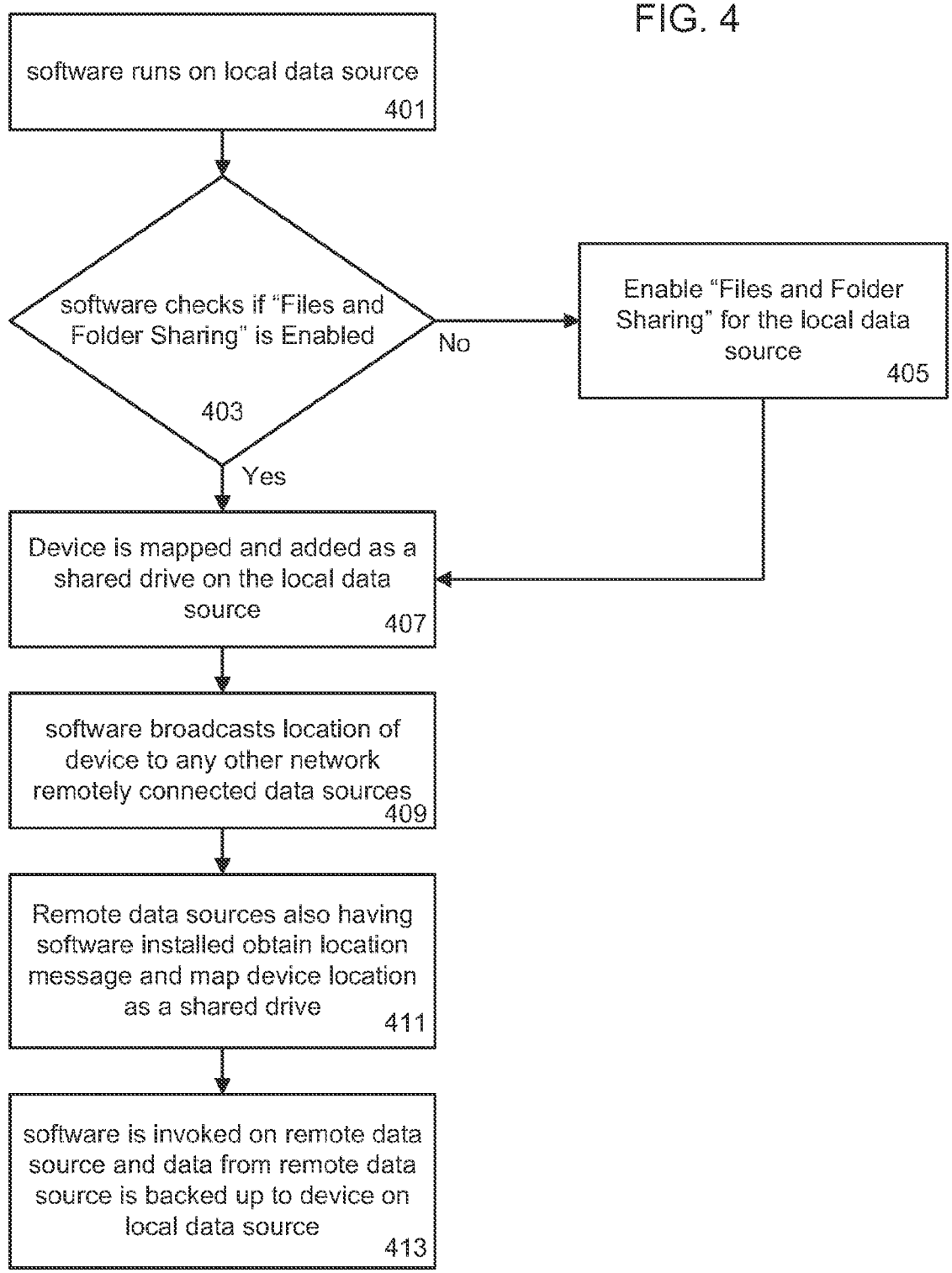
FIG. 4 is a flow chart representation of one approach as to how the associated software makes the backup device accessible across the network.

Referring now to FIG. 4 which shows one way in which the backup device becomes accessible to the remote data source for performing the backup operations described herein. In step 401, the software is running on a data source to which the backup device is attached thus making this data source the local data source.

As part of the configuration the software running on the local data source checks, in step 403, to see if the "Files and Folder Sharing" feature is enabled. "File and Folder Sharing" is a feature that is offered in Microsoft Windows operating systems that allows users with multiple computers connected through a local area network to share files amongst the computers. Such functionality means one no longer has to copy files to a removable disk or a USB flash drive to transfer them from one computer to another and the files can be opened from other computers connected to the network. If "Files and Folder Sharing" is not enabled then the software turns on this feature in step 405.

Various additional steps are performed in some embodiments. For example, if wireless connectivity is running on the data source then the software can be added to an exception list within a set of rules for the wireless connectivity thus allowing the software to intemperate wirelessly. As another example, if certain needed services (e.g., Computer Browser Service, Workstation Service, Server Service and TCP/IP Netbios) are not currently running then they will be started by the software.

Once "Files and Folder Sharing" is enabled, in step 407, the software running on the local data source causes the backup device to be mapped and added as a shared drive to the local data source.

In step 409, the software running on the local data source broadcasts the location of the backup device across the network to any remote data source connected to the network. Using the software installed and running on them, remote data sources, where the software of the invention is installed but the backup device is not directly connected, pick up the location broadcast message (using what may be called a "listener" process) and map the backup device location on the local data source as a shared drive in step 411. The backup process of the software running on the remote data sources can then be invoked on these remote data sources and the data from these remote Data Sources can be backed up to the backup device connected to the local data source over the local area network (LAN) in step 413.

Figure 5:
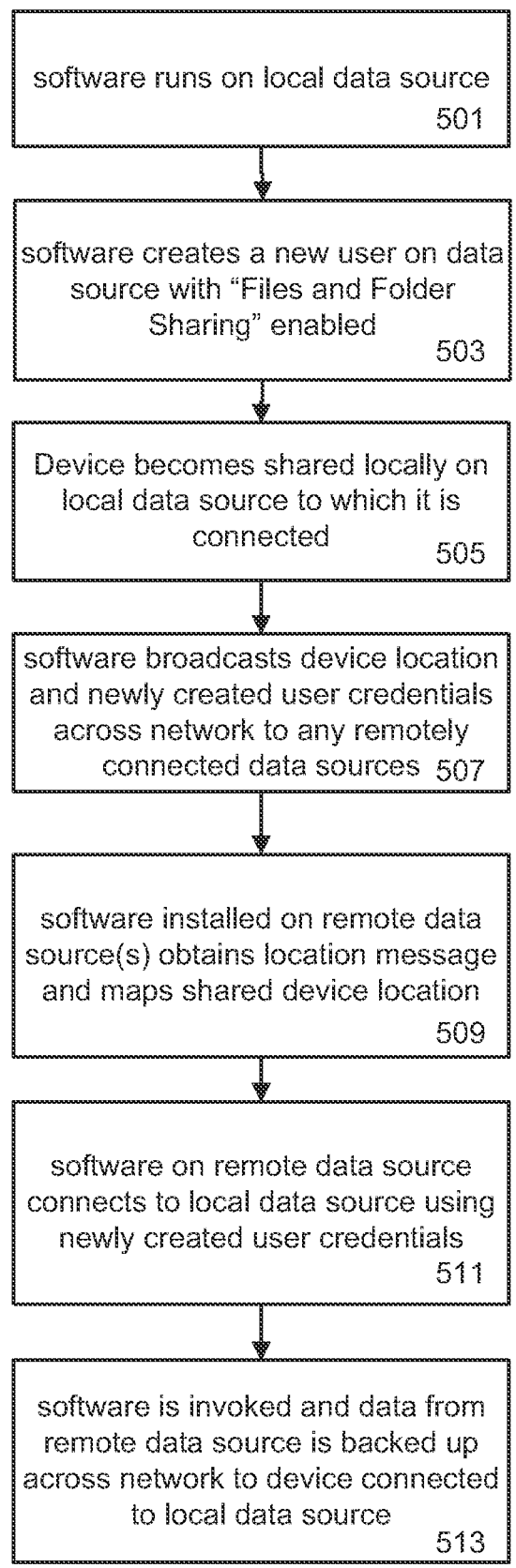
FIG. 5 is a flow chart representation of another approach as to how the associated software makes the backup device accessible across the network.

Referring now to FIG. 5 which shows another way in which the backup device becomes accessible to the remote data source for performing the backup operations described herein. In step 501, the software is running on a data source to which the backup device is attached thus making this data source the local data source.

As part of the configuration the software running on the local data source creates a new user on the local data source with the "Files and Folder Sharing" feature enabled in step 503. This approach can be used in lieu of the approach of FIG. 4 or in the event that the local data source does not allow the software to enable the "Files and Folder Sharing" function for any reason.

Once "Files and Folder Sharing" is enabled, the software running on the local data source causes the backup device to be mapped and added as a shared drive to the local data source in step 505.

In step 507, the software running on the local data source broadcasts the location of the backup device as well as the newly created user credentials across the network to any remote data source connected to the network. Using the software installed and running on them, remote data sources, where the software of the invention is installed but the backup device is not directly connected, pick up the broadcast message (using a listener process) and map the backup device location on the local data source as a shared drive in step 509. The backup process of the software running on the remote data sources can then be invoked on these remote data sources so the remote data sources can connect to the local data source using the received newly created user credentials in step 511. Then the data from these remote data sources can be backed up to the backup device connected to the local data source over the local area network (LAN) in step 513.

Figure 6:
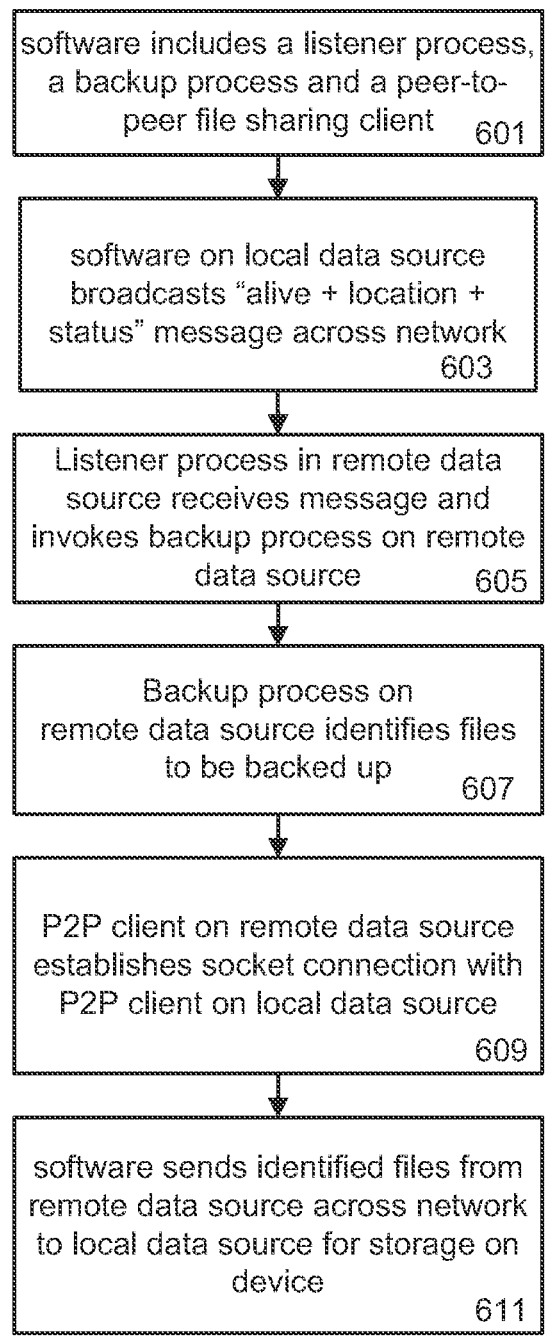
FIG. 6 is a flow chart representation of still another approach as to how the associated software makes the backup device accessible across the network.

Referring now to FIG. 6 which shows another way in which the backup device becomes accessible to the remote data source for performing the backup operations described herein when the approach of FIG. 4 or FIG. 5 is not possible or not implemented. In step 601, the software is running on a data source to which the backup device is attached thus making this data source the local data source. In this embodiment, the software includes a Peer-to-Peer (P2P) client in addition to a listener process. In step 603, the software running on the local data source broadcasts an "alive/location/status" message across the network to any other remote data sources.

In step 605, the software on a remote data source receives the broadcast message via the listener process included in the software on each data source thus causing it to invoke a backup process on the remote data source.

In step 607, the backup process on the remote data source identifies the files to be backed up.

In step 609, the software on the remote data source establishes a socket connection with the local data source via the P2P client included in the software on each data source.

in step 611 the software on the remote data source sends the files identified to be backed up across the network to the local data source using the socket connection so the files can be stored on the backup device connected to the local data source.

The approach of FIG. 6 overcomes the limitations sometimes faced when encountering firewalls and scenarios where use of the "Files and Folder Sharing" function is restricted. Additionally, if the transmission of the files is disrupted mid stream while a data source is being backed up, it can be restarted from where it left off, since the P2P client may preferably track and manage the file transfer from the remote data source to the backup device connected to the local data source.

It is to be understood that the approaches described with reference to FIGS. 4, 5 and 6 can be alternative embodiments or any one or more approach may be included in a single embodiment including an embodiment where the approach of FIG. 4 is first tried and then, if unsuccessful, the approach of FIG. 5 is tried and then, if unsuccessful, the approach of FIG. 6 is tried.

In another embodiment the backup starts immediately after a large file or a user designated file is saved on a data source. In yet another embodiment, the backup starts immediately after a configurable number of files have been saved on a data source. In another embodiment the backup starts after the saved data on a data source reaches a certain user configurable size (e.g., 100 MB).

In one embodiment, the files are backed up based on a schedule either pre-configured in the software by the manufacturer or user configurable. In one embodiment of the invention, the user can schedule a backup time for either one or all data sources, and they are backed up as per the schedule set by the user. If a backup schedule window is missed the backup can then be performed when the backup device is reconnected to a data source and broadcasts its location across the network.

In one embodiment, the backup from the data sources connected to the local area network to the backup device is a continuous backup process. In such a scenario, the files are backed to the backup device essentially as soon as they are changed or saved on the data source.

In one embodiment the user can initiate the backup process for any Data Source connected to the local area network by using a graphical user interface of the software.

In one embodiment, the backup is performed essentially immediately when the backup device of the invention is connected to any of the data sources attached to the local area network.

In one embodiment, the backup is performed in a sequence, e.g., the local data source to which the backup device is attached is backed up first and then any remote data sources are backed up. In an alternative embodiment, the opposite sequence is performed. In a still further embodiment, the local data source is backed up while any remote data sources are backed up.

In one embodiment, the software that is automatically launched from the backup device preferably backs up the data source upon connection. The software also has the intelligence to selectively search the data source for digital files based on a certain criteria, e.g., by file extension. Once selective files have been identified, with or without any user modifications to the selections as may be accomplished via a Graphical User Interface (GUI), the software is also responsible for transmitting these over the local area network to the local data source to which the backup device is connected to thereby be backed up. Thus the software preferably may have a pre-defined list of most prevalent file extensions of data files built-in (included by the manufacturer) and optionally the user may choose to add to this list preferably using a GUI.

In the Microsoft Windows Vista operating system (OS) unlike earlier versions of Microsoft's OSs (e.g., Windows XP, Windows 2000 etc.), a larger number of external and internal devices can use the native AutoRun functionality of the operating system. Up to Microsoft Windows XP, a CD-ROM and a Floppy Drive were the only two devices which were allowed by the OS to execute the AutoRun functionality and devices like external hard drives and USB Flash Drives were unable to make use of this functionality and had to "emulate" as a CD-ROM or a Floppy Drive to "fool" the earlier Microsoft Windows operating systems into thinking that an AutoRun enabled device (e.g. a CD-ROM) had been connected to it.

With Microsoft Windows Vista any external device that reports itself as a "removable" device can take advantage of the AutoRun functionality. Thus in one embodiment, to take advantage of this feature in Microsoft Windows Vista, the backup device reports itself as a "removable" device, triggering the AutoRun functionality which launches the software application initiating the extraction of the digital files from the Data Source to the VNAS device for backup.

The data source as referred to herein, especially in the described embodiments, is typically a personal computer with a set of electronic data files to be backed-up. However, such data source is not limited to the examples cited here and could be a home personal computer (PC), corporate PC, a server, a laptop, a set-top box, an Apple Macintosh computer, a cellular phone, a smartphone, a personal digital assistant (PDA), a personal video recorder (PVR), etc., running any number of different operating systems as diverse as the Microsoft Windows family, the Apple Macintosh Operating System (MacOS), any variation of Linux or Unix, Palm Computing Operating System (PalmOS), or such operating systems used for such devices available in the market today or the ones that will become available as a result of the advancements made in such industries.

The examples noted here are only for illustrative purposes and there may be further embodiments possible with a different set of components. While several embodiments are described, there is no intent to limit the disclosure to the embodiment or embodiments disclosed herein. On the contrary, the intent is to cover all alternatives, modifications, and equivalents obvious to the ones familiar with the art.

In one embodiment, the user flagged files are backed up before others files. Thus all user flagged files from all data sources are backed up before all other files are backed up. There may be combinations of the above embodiments, and the invention is not limited to any one of those, but the intent is to covers all combinations that are apparent to the ones skilled in the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system for backing up network connected data sources, the system comprising:
    a backup device containing a data storage area and a communications interface for connection to a first data source of the network connected data sources;
    a non-transitory computer readable medium containing program code executable by a processor of the first data source to perform without user input the steps of:
    configuring the first data, source for communication across the network with a second data source of the network connected data sources;
    performing a backup of the first data source by storing data to be backed up from the first data source to the backup device;
    performing a backup of the second data source by:
    establishing communication across the network between the first data source and the second data source;
    receiving at the first data source from the second data source across the established communication data to be backed up from the second data source; and
    storing to the backup, device the received data to be backed up from the second data source.

2. The system of claim 1 wherein the program code executable by a processor to perform without user input further comprises the step of installing the program code on the first data source before the step of configuring the first data source for communication across the network with a second data source of the network connected data sources.

3. The system of claim 1 wherein the non-transitory computer readable medium is an optical disc.

4. The system of claim 1 wherein the non-transitory computer readable medium is a network accessible server.

5. The system of claim 1 wherein the backup device further comprises an emulation component configured to automatically launch the program code when the backup device is connected to the first data source.

6. The system of claim 1 where the program code executable by a processor to perform without user input the step of configuring the first data source for communication across the network with the second data source comprises the steps of:
   enabling Files and Folder sharing on the first data source;
   mapping the backup device as a shared drive on the first data source.

7. The system of claim 6 where the program code executable by a processor to perform without user input the step of establishing communication across the network between the first data source and the second data source comprises the steps of:
   broadcasting from the first data source across the network the location of the backup device;
   receiving across the network at the second data source the broadcast location of the backup device; and
   mapping the broadcast location of the backup device as a shared drive on the second data source.

8. The system of claim 1 where the program code executable by a processor to perform without user input the step of configuring the first data source for communication across the network with the second data source comprises the steps of:
   creating a new user on the first data source with Files and Folder sharing enabled on the first data source;
   mapping the backup device as a shared drive on the first data source.

9. The system of claim 8 where the program code executable by a processor to perform without user input the step of establishing communication across the network between the first data source and the second data source comprises the steps of:
   broadcasting from the first data source across the network the location of the backup device and credentials of the new user created on the first data source;
   receiving across the network at the second data source the broadcast location of the backup device and the credentials of the new user created on the first data source;
   mapping the broadcast location of the backup device as a shared drive on the second data source; and
   connecting from the second data source to the first data source using the credentials of the new user created on the first data source.

10. The system of claim 1 where the program code executable by a processor to perform without user input the step of establishing communication across the network between the first data source and the second data source comprises establishing a socket connection between a peer-to-peer client on the first data source and a peer-to-peer client on the second data source.

11. A method of backing up network connected data sources, the method comprising:
   automatically and without user input launching and installing software from a backup device to a first data source of the network connected data sources upon detection of connection of the backup device to the first data source, the installed software configured to automatically and without user input perform the steps of:
      configuring the first data source for network backup communications;
      performing a backup of data from the first data source to the backup device connected to the first data source;
      establishing communication across the network between the first data source and a second data source of the network connected data sources, the software from the backup device having previously been automatically and without user input launched and installed on the second data source;
      performing a backup of data from the second data source to the backup device by:
         receiving at the first data source from the second data source across the established communication data to be backed up from the second data source; and
         storing to the backup device the received data to be backed up from the second data source.

12. The method of claim 11 wherein the step of automatically and without user input launching and installing software from the backup device to the first data source upon connection of the backup device to the first data source is triggered by an autorun function.

13. The method of claim 11 wherein the step of configuring the first data source for network backup communications is by enabling a Files and Folder Sharing function on the first data source.

14. The method of claim 11 wherein the step of configuring the first data source for network backup communications is by creating a new user on the first data source with a Files and Folder Sharing function enabled.

15. The method of claim 11 wherein the step of establishing communication across the network between the first data source and the second data source is by establishing a socket connection between a peer-to-peer client on the first data source and a peer-to-peer client on the second data source.

16. A method of backing up data to a backup device from a first and a second network connected data source, the method comprising:
   automatically launching and installing on the first data source backup software from the backup device in response to detection of the backup device being connected to the first data source;
   backing up data from the first data source to the backup device connected to the first data source using the backup software;
   automatically launching and installing on the second data source backup software from the backup device in response to detection of the backup device being connected to the second data source;
   backing up data from the second data source to the backup device connected to the second data source using the backup software;
   establishing communication across the network between the first data source and the second data source;
   backing up data from the first data source to the backup device connected to the second data source using the backup software.

17. The method of claim 16 wherein automatically launching and installing backup software from the backup device in response to detection of the backup device being connected is by an autorun function.

18. The method of claim 16 wherein establishing communication across the network between the first data source and the second data source is by enabling a Files and Folder Sharing function on the second data source.

19. The method of claim 16 wherein establishing communication across the network between the first data source and the second data source is by creating a new user on the second data source with a Files and Folder Sharing function enabled.

20. The method of claim 16 wherein establishing communication across the network between the first data source and the second data source is by establishing a socket connection between a peer-to-peer client on the first data source and a peer-to-peer client on the second data source.

* * * * *